United States Patent
Strub

(10) Patent No.: US 7,523,166 B2
(45) Date of Patent: Apr. 21, 2009

(54) METHOD AND DEVICE FOR MESSAGE BROADCASTING ENABLING THE RECIPIENT TO RETRIEVE AT LEAST PARTLY A MESSAGE

(76) Inventor: Daniel Strub, 105, Rue du General de Gaulle, Poissy (FR) F-78300

( * ) Notice: Subject to any disclaimer, the term of this patent is extended or adjusted under 35 U.S.C. 154(b) by 374 days.

(21) Appl. No.: 10/477,175

(22) PCT Filed: May 10, 2001

(86) PCT No.: PCT/FR01/01407

§ 371 (c)(1),
(2), (4) Date: Jul. 26, 2004

(87) PCT Pub. No.: WO02/091253

PCT Pub. Date: Nov. 14, 2002

(65) Prior Publication Data

US 2004/0243681 A1    Dec. 2, 2004

(51) Int. Cl.
G06F 15/16 (2006.01)
H04M 15/00 (2006.01)
H04N 7/16 (2006.01)
H04N 7/10 (2006.01)
G06Q 30/00 (2006.01)

(52) U.S. Cl. .................. 709/206; 709/203; 379/114.13; 379/114.01; 725/22; 725/32; 705/14

(58) Field of Classification Search .................. 709/217, 709/219, 206, 203; 379/67.1, 74, 88.01, 379/88.17, 88.18, 114.13, 114.01; 705/14; 725/22, 32
See application file for complete search history.

(56) References Cited

U.S. PATENT DOCUMENTS

| 4,785,473 | A | 11/1988 | Pfeiffer |
| 4,850,007 | A * | 7/1989 | Marino et al. .......... 379/114.13 |
| 5,721,827 | A | 2/1998 | Logan et al. |
| 5,768,348 | A * | 6/1998 | Solomon et al. ........... 379/67.1 |
| 5,796,394 | A | 8/1998 | Wicks et al. |
| 5,937,038 | A * | 8/1999 | Bell et al. ................ 379/93.17 |
| 5,953,487 | A * | 9/1999 | Engle et al. ................... 386/68 |
| 6,091,947 | A * | 7/2000 | Sumner ...................... 455/413 |
| 6,246,756 | B1 * | 6/2001 | Borland et al. ......... 379/142.01 |
| 6,385,308 | B1 * | 5/2002 | Cohen et al. ............. 379/88.23 |
| 6,603,838 | B1 * | 8/2003 | Brown et al. ............. 379/88.22 |
| 7,136,470 | B1 * | 11/2006 | Taylor et al. ........... 379/114.13 |
| 7,149,777 | B1 * | 12/2006 | Rhee .......................... 709/206 |

FOREIGN PATENT DOCUMENTS

| EP | 0 698 985 | 2/1996 |
| WO | WO 00 56781 | 9/2000 |

* cited by examiner

Primary Examiner—Kevin Bates
(74) Attorney, Agent, or Firm—Young & Thompson

(57) ABSTRACT

In an interactive method for restoring messages in an automated message broadcast system, the automated message broadcast system comprises at least a message storage system (10) storing messages and a message restoring device (13), the message storage system (10) being capable of transmitting stored messages to the message restoring device (13), the message storage system (10) capable of carrying out a number of operations on a message during transmission. The message storage system (10) accepts to perform the operations on the message during transmission only after expiry of a minimum delay as from the beginning of the transmission of the message to the message restoring device (13).

32 Claims, 5 Drawing Sheets

METHOD AND DEVICE FOR MESSAGE BROADCASTING ENABLING THE RECIPIENT TO RETRIEVE AT LEAST PARTLY A MESSAGE

The present invention relates generally to automated processes and systems for broadcasting messages, and more particularly to a process and a system for broadcasting messages of an advertising nature which permit guaranteeing to an advertiser the at least partial retrieval of an advertising message by the recipients to which the message has been sent.

DESCRIPTION OF THE RELATED ART

The techniques for communication of messages of an advertising nature have developed techniques of display and insertion in the press during previous centuries up to the present techniques of broadcasting in television media, data communication or the Internet, of passing through communication techniques based on vocal messages on fixed or mobile telecommunication terminals.

The conventional techniques for broadcasting purely visual advertising messages such as communication by display or inserts in the papers, have the well-known drawbacks that the potential recipients of these advertising messages simply by glancing away from the displays or the advertising inserts.

Similarly, communications in a text form such as messages of the SMS type transmitted on a telephonic radio receiver or advertising on data communication pages of the Internet type, can be easily ignored by their potential recipients for the same reasons.

To respond to this problem, recourse is nowadays had more and more often to techniques of broadcasting advertising messages by sound, if desired combined with visual techniques, which have the interest that the potential recipient cannot avoid hearing an advertising message in the form of sound.

However, the recipient of an advertising message can still physically remove himself from the message broadcasting device, or not pay attention to the advertising messages.

To overcome this problem, techniques of advertising message broadcasting by telephone have been developed, such as those described in WO 98/49826, in which the messages of an advertising nature are inserted in telephone communications between two users, in return for partial or total refund of the cost of the telephone communication in question.

This technique is very restrictive, or even difficult to carry out with two users in communication, in particular for the one of the users who does not benefit from the telephone communication, and as a result, it has not had widespread success. Moreover, this technique can have serious drawbacks, even grave ones, in the case in which the telephone communication takes place in an urgent medical situation or the like, on which an advertising interruption, even instantaneous, can have very serious consequences.

Similarly, there is known from FR 2 798 801 a technique permitting storing advertising messages of an advertiser on a vocal message server, a user being able to select and consult a message, ignore a message or use a message to gain access to a service. However, this type of technique has the drawback that there exists no means for the advertiser to ensure himself that at least a significant part of his advertising message will have been heard by the user before deletion of the message in question by this latter.

This situation has the effect of rendering uncertain for an advertiser the return on his investment in advertising campaigns based on this type of support in the field of the prior art. In particular, in the case of advertising messages sent with partial or total refund of the cost of the telephone communication, the advertiser will necessarily take a loss if the recipient can avoid hearing the advertising messages constituting the partial or total refund of his subscription.

Moreover, in quite another field, it could be essential to ensure that the recipient of a message has in fact retrieved it. Thus, in the case of the conduct of industrial processes or controlling engines such as those of aircraft, the human operators in question are frequently solicited by message of all natures from an automated system, and their attention span tends as a result to narrow. This has the consequence that the operators risk reacting in a mechanical or a districted fashion to a message received from the system of which they are in charge. Because of this, there exists a substantial probability that the content of an urgent or even vital message will not be effectively recognized by the operator in question, if a suitable technique is not used to ensure that the latter has not indeed taken account of at least a significant portion of the content of such a message.

There accordingly exists a need for a process and a system which permit ensuring that the recipient of a message has indeed taken account of at least a significant portion of the content of the message.

SUMMARY OF THE INVENTION

The present invention thus has for its object to provide an interactive process for reproduction of messages in an automated system for broadcasting messages, said automated system for broadcasting messages comprising at least a system for storing messages and a device for reproducing messages, said message storing system being adapted to transmit stored messages to said device for reproducing messages, said device for reproducing messages permitting the reproduction in real time for an operator, of messages transmitted by said message storage system, said message storage system being adapted to carry out a certain number of operations on a message in the course of transmission, said message reproduction device being adapted to transmit to said message storage system at least a control system under the control of said operator during the transmission of a message, each of said at least one control signals permitting commanding said message storage system to carry out on said message in the course of transmission a corresponding operation from among said operations, said message reproducing device comprising at least one control device permitting said operator to generate said at least one control signals destined for said message storage system, and which has the characteristic that said message storage system does not accept to carry out said operations on said message in the course of transmission until after the expiration of a minimum delay from the beginning of transmission of said message to said device for reproducing messages.

In this process, said message storage system and said device for reproducing messages, can communicate via a communication channel. In this case, said communication channel can be a radio connection and said device for reproducing messages is thus a radio communication terminal. Similarly, said communication channel can be a telephone line connection and said device for reproducing messages is thus a conventional telephone station. Said communication channel can also be a telematic connection and said device for reproducing messages is thus a telematic communication terminal. Also, said communication channel can be an interactive television connection and said device for reproduction of messages is thus an interactive television receiver. Said communication channel can also be a computer network and said device for reproduction of messages is thus a computer system connected to said computer network.

The messages stored in said message storage system and transmitted to said device for reproduction of messages can comprise at least one sonic portion. Said messages stored in said storage system for messages and transmitted to said device for reproduction of messages can also comprise at least one vocal message portion. In this case, said system for storing messages could be a vocal message server.

The messages stored in said message storage system and transmitted to said device for reproduction of messages could also comprise at least one portion comprised by a text, as well as at least one image or an assembly of images that are stationary or animated. Moreover, said messages stored in said storage system for messages and transmitted to said device for reproduction of messages, could permit an interactive dialog with the operator.

In the process of the invention, said operations that can be carried out on the message in the course of transmission can comprise an operation permitting the deletion of the message in the course of transmission and of at least one other message and of at least one other message in a single operation.

Similarly, at least one of said control signals commanding the message storage system to carry out at least one of said operations on said message in the course of transmission, can be determined in real time by said message storage system and transmitted in real time by said storage system for messages to said operator via said device for reproduction of messages. In this case, one of said at least one predetermined control signals transmitted by said message storage system can be transmitted by said message storage system at any instant within said minimum delay from the beginning of said transmission of said message. Said at least one control signal predetermined and transmitted by the storage system can thus comprise a signal acknowledging reception of the message in the course of transmission. Moreover, said storage system can thus ignore the operations other than the acknowledgement of reception of the message in the course of transmission up to the reception of the acknowledgement of reception. Moreover, said storage system can retransmit at least partially the message in the course of transmission during reception of an operation other than acknowledgement of reception.

In the process of the invention one of said at least one control devices present in said device for reproduction of messages to send said at least one control signal to said system of message storage, can for example be a keyboard or a control device comprising at least one key. In this case, one of said at least one control signals permitting carrying out an operation on a message in the course of transmission is the signal generated by the actuation of a key from among said at least one keys present on the keyboard or said control device comprising at least one key.

Similarly, one of said at least one control devices present in said device for reproduction of messages to send said at least one control signal to said message storage system, can be a microphone, and one of said at least one control signals permitting carrying out an operation on a message in the course of transmission will thus be a vocal control entered by said operator by means of said microphone and transmitted to said storage device by said message broadcast device.

Also, one of said at least one control devices present in said device for reproduction of messages to send said at least one control signal to said system of message storage, could be a voice recognition device, and one of said at least one control signals permitting carrying out an operation on a message in the course of transmission will thus be a vocal control entered by said operator by means of said voice recognition device.

In the process according to the invention, said minimum delay can for example be three seconds.

In general, said messages stored in said message storage system and transmitted to said message reproduction device will be messages of an advertising nature.

Moreover, said device for storing messages could furthermore store for each stored message information representative of the duration of said minimum delay for said message. In this case, the duration of said minimum delay could be reduced to zero for certain messages.

The invention also proposes an automated system for broadcasting messages, said automated system for broadcasting messages comprising at least one system for storing messages and a device for reproduction of messages, said system for storing messages being able to transmit stored messages to said device for reproducing messages, said device for reproducing messages permitting the reproduction in real time for an operator of messages transmitted by said message storage system, said message storage system being adapted to carry out a certain number of operations on a message in the course of transmission, said message reproduction device being adapted to transmit to said message storage system at least one control signal under the control of said operator during the transmission of a message, each of said at least one control signals permitting controlling said message storage system so as to carry out on said message in the course of transmission a corresponding operation from among said operations, said device for reproducing messages comprising at least one control device permitting said operator to generate said at least one control signals destined for said message storage system, and which has the characteristic that it uses the above process.

BRIEF DESCRIPTION OF THE FIGURES

There will now be described, solely by way of example, two embodiments of the invention with reference to the accompanying figures, in which.

Figure 1:
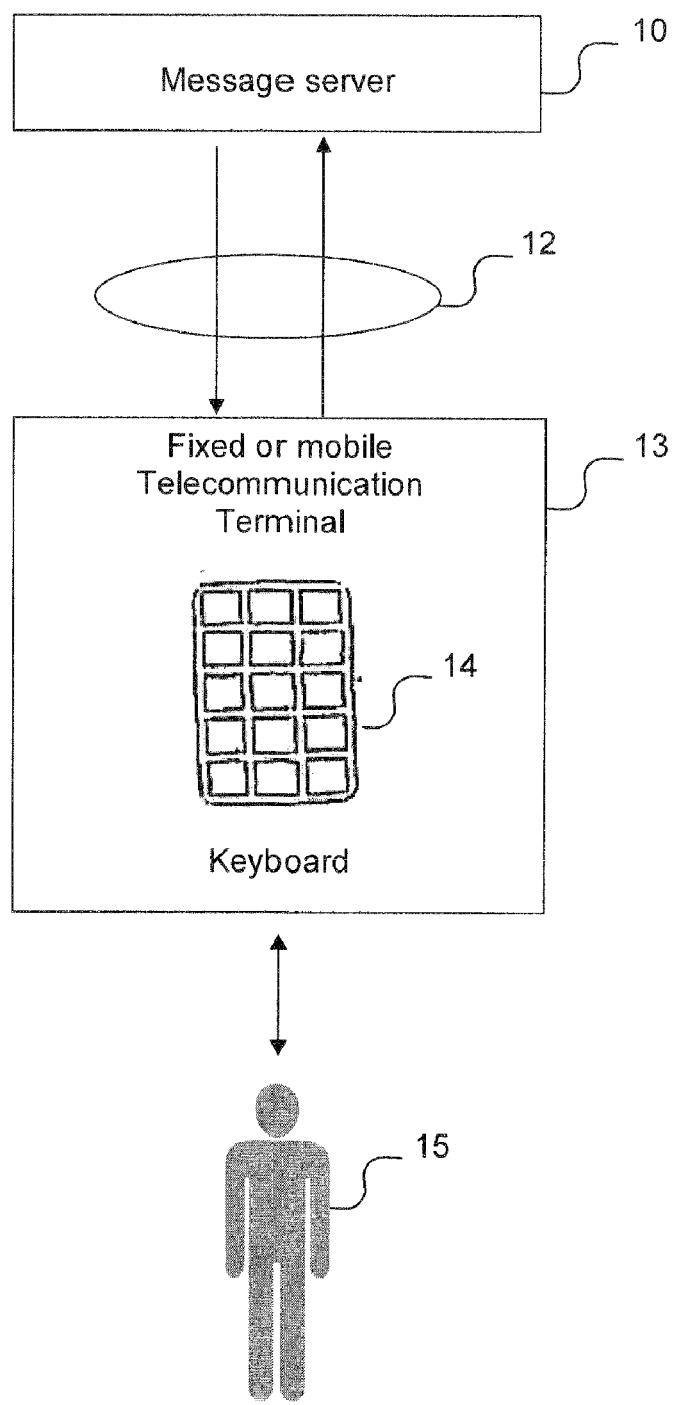
FIG. 1 is a functional schematic of a system for broadcasting vocal messages used both in the prior art and in the processing system according to the present invention.

DETAILED DESCRIPTIOON OF THE
PREFERRED EMBODIMENTS

Referring to FIGS. 1 to 5, there will now be described in a general manner the transmission of a message of advertising nature by a vocal message server, as embodied in the scope of the prior art or the present invention.

In the case of the prior art technique as in the case of the present invention, a message server 10 is connected to a fixed or mobile telecommunication terminal 13 by a fixed telephone line or radio 12, and the user 15 interacts with the fixed or mobile telecommunication terminal 13 with the help of a keyboard 14.

When the user 15 desires to retrieve possible messages stored for his attention in the message server 10, he types on the keyboard 14 the telephone number corresponding to the message server 10.

Conventionally, during reception of the call of the user 15, the message server 10 identifies the calling user 15, then the message server 10 thus transmits the messages held for the user 15 thus identified. The user 15 can then choose to interrupt, save or delete a message in the course of transmission or the last transmitted message. To do this, the operator 15 sends suitable control signals to the message server 10 with the help of corresponding keys of the keyboard 14 of the fixed or mobile telecommunication terminal 13.

When all the backed up messages have been transmitted, the server 10 informs the user 15 that there are no more messages awaiting, then the server 10 awaits the user 15 to end the communication, or to carry out other operations, such as reading messages previously saved.

In the prior art technique, as in the field of the present invention, if the user 15 ends the communication during transmission of a message, this latter is saved by the message server 10, and it will be again presented to the user 15 as if it had not begun to be transmitted, during the following connection of the user 15 to the message server 10.

Figure 2:
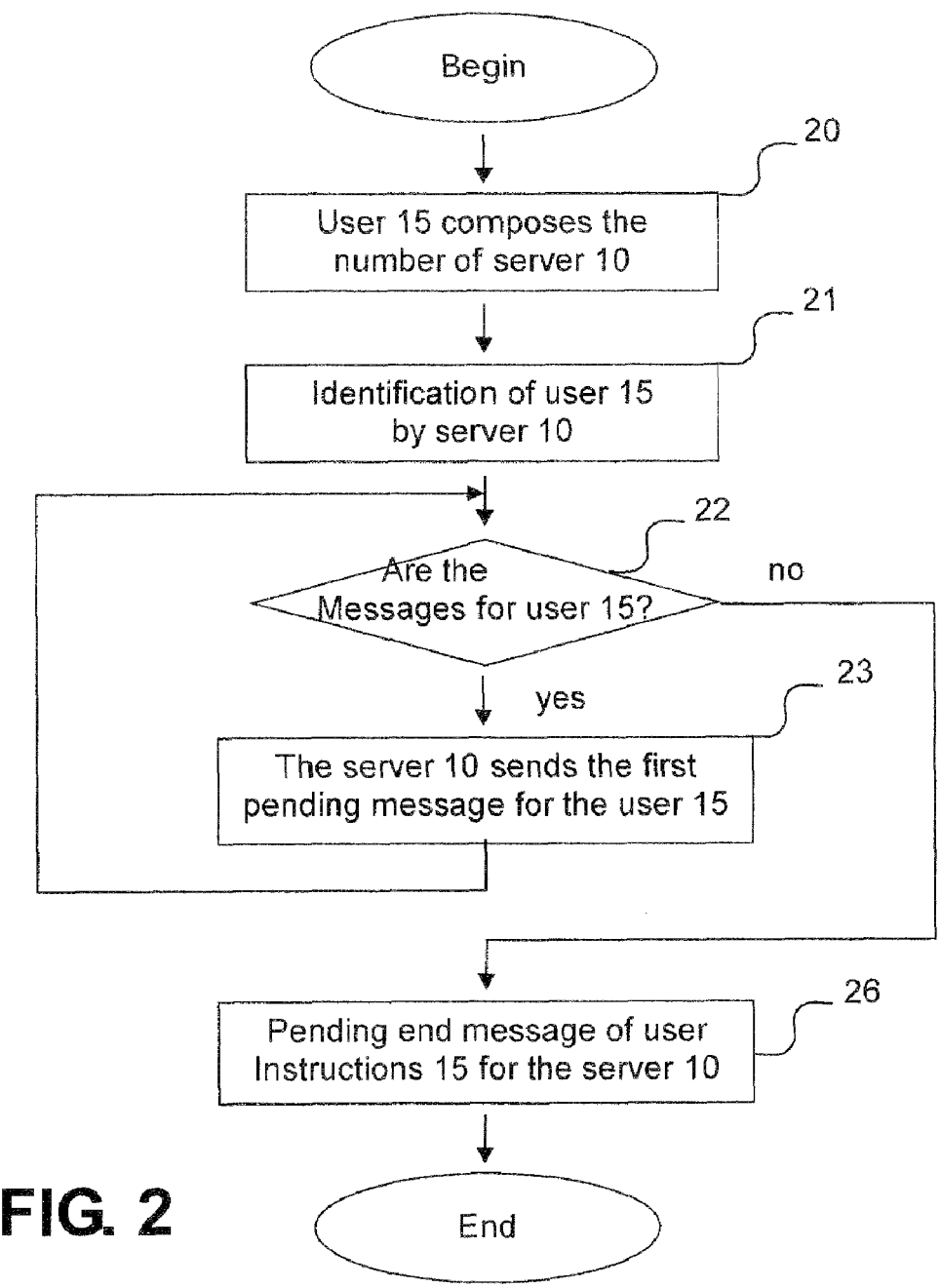
FIG. 2 is an organigram of the principle of broadcasting a vocal message on a fixed telephone line or radio, both in the prior art and in the scope of the present invention.

More precisely, in step 20 of FIG. 2, the user 15 composes on the keyboard 14 of his telecommunication terminal 13 the telephone number permitting accessing the message server 10. Then, in step 21, the message server 10 identifies the user 15 either by means of his calling telephone number, or by means of internal information in the telecommunication terminal 13 such as the number of a smart card (not shown) present in the telecommunication terminal 13. As a modification, the user 15 identifies himself by entering a code on the keyboard 14 of the telecommunication terminal 13, this code being thus transmitted to the message server 10 by the telecommunication terminal 13 via the telephone line 12. Once step 21 is finished, the server 10 passes to step 22.

In step 22, the message server 10 determines whether there are messages awaiting the user 15 thus identified. If the response is negative, the message server 10 passes to step 26.

In step 26, the server 10 indicates to the user 15 that there are no more waiting messages, and the server 10 thus awaits the instructions of the user 15, such as the consultation or the deletion of messages previously saved, or that the user 15 ends the telephone communication.

If the response in step 22 is positive, the message server 10 passes to step 23, in which the message server 10 transmits to the operator 15 the first stored message for this latter, then the message server 10 returns to step 22 described above.

Figure 3:
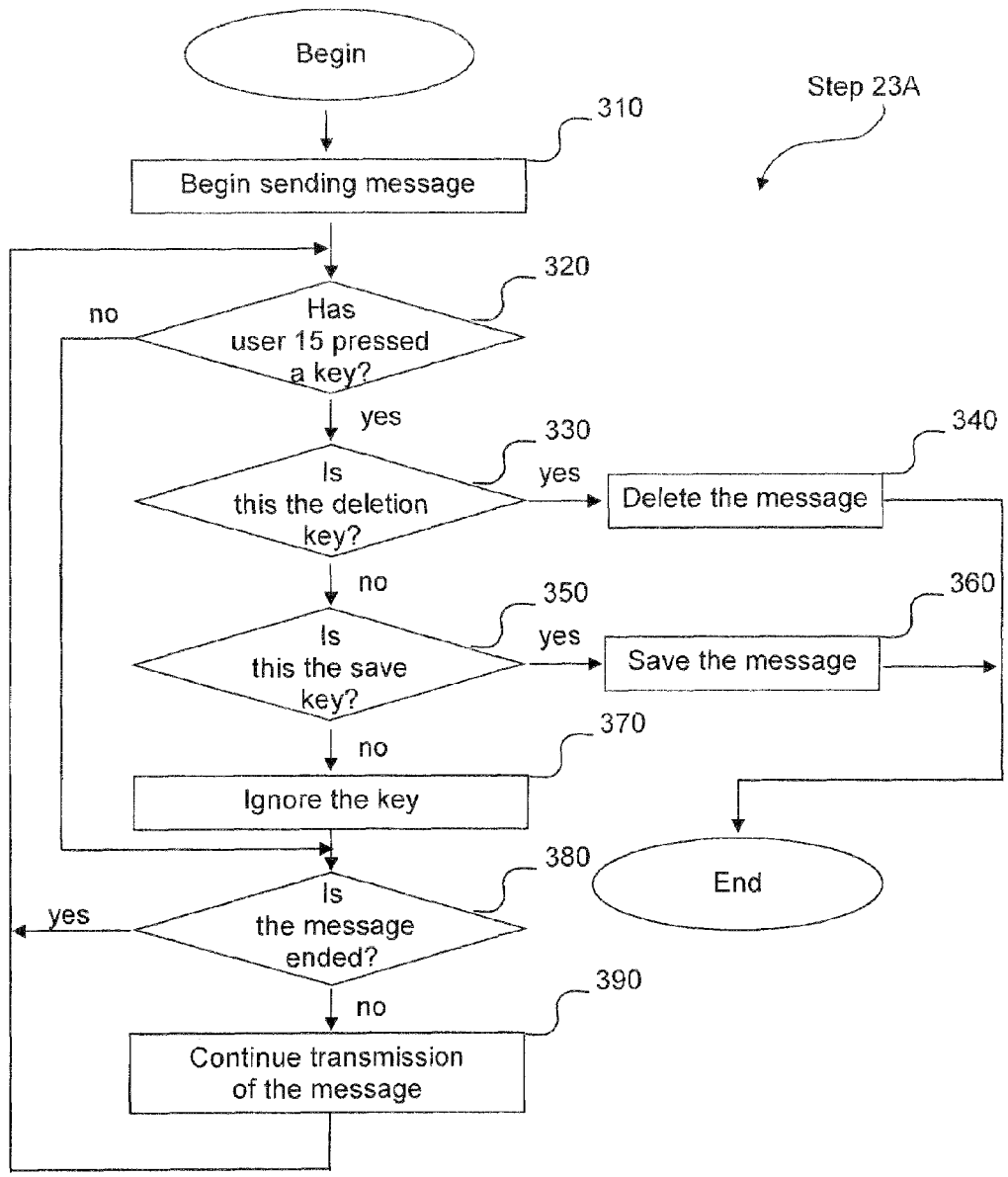
FIG. 3 is a detailed organigram of box 23 of FIG. 2 in the case of the prior art.

Referring now to FIG. 3, there will now be described in detail step 23 of FIG. 2 in the case of the prior art, designated by reference 23A in FIG. 3.

In step 310 of FIG. 3, the message server 10 begins to send the message awaiting the user 15, then it passes to step 320.

In step 320, the message server 10 tests whether the user 15 has pressed the key of keyboard 14 of the telecommunication terminal 13. If the response is negative, the message server 10 passes to step 380 described later in this paper. If the message is positive in step 320, the message server 10 passes to step 330.

In step 330, the message server 10 determines whether the key that the user 15 has pressed, is the key requiring deletion of the message in the course of transmission. If the response is positive, the message server 10 passes to step 340 in which the server 10 deletes the message in the course of transmission from the list of messages awaiting the user 15, and step 23A of transmission of a message according to the prior art is terminated.

If in step 330, the response is negative, the message server 10 then passes to step 350. In step 350, the message server 10 tests whether the key that the user 15 has pressed is the key controlling the saving of the message in the course of transmission. If the response is positive, the message server 10 passes to step 360 in which the message in the course of transmission is saved by the server 10, and step 23A of the message transmission is thus terminated.

If the response in step 350 is negative, then the server 10 passes to step 370 in which the key pressed by the user 15 is ignored. The message server 10 then passes to step 380.

In step 380, the server 10 tests whether the message in the course of transmission has been entirely transmitted. If the response is positive, the server 10 then returns to step 320 described above. If the response in step 380 is negative, the message server 10 passes to step 390 in which the message server 10 continues to send the message. Then the message server 10 returns to step 320 described above.

In the above description of FIG. 3, when the transmission of the message is completed, the message server 10 returns to step 22 in FIG. 2.

As previously mentioned, it will be seen that, in the prior art, the user 15 can interrupt at any time the transmission of a message, and a result there is no certainty that a significant portion of the transmitted message has been understood by the recipient 15, because, in the great majority of cases, this latter will interrupt the transmission of the message as soon as he has determined that it is an advertising message, and not a personal message.

Figure 4:
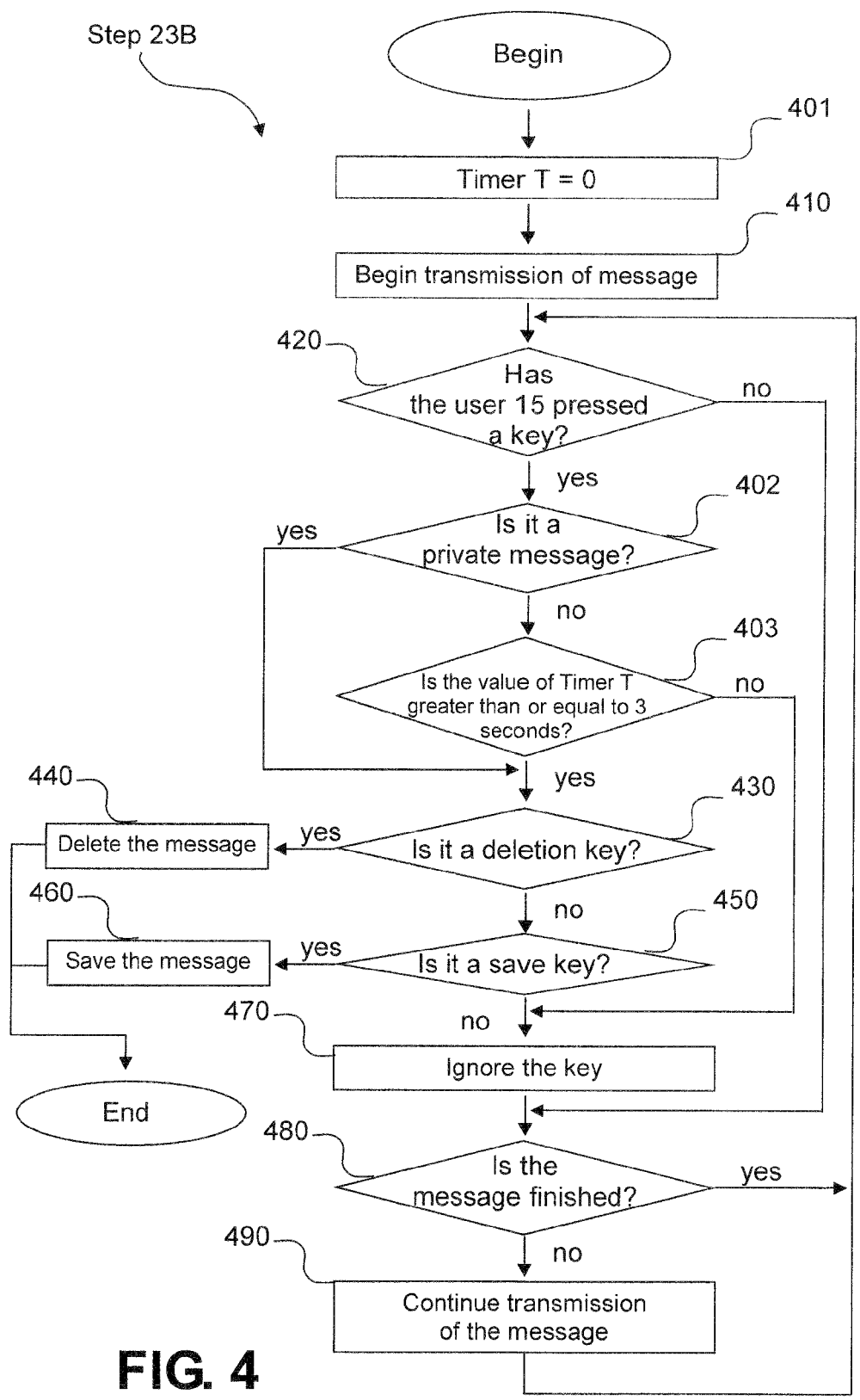
FIG. 4 is a detailed organigram of box 23 of FIG. 2 in a first embodiment of the present invention.

Referring now to FIG. 4, there will now be described in detail step 23 of FIG. 2 in the field of a first embodiment of the present invention, designated by reference 23B in FIG. 4.

The procedure of sending a message to the user 15 by the server 10 begins in step 401. In step 401, the server initiates at a value 0 a counter of time T, adapted to measure the time elapsed from the beginning of transmission of the message. This server 10 then passes to step 410.

In step 410, the message server 10 begins to send the message destined to the user 15, then it passes to step 420.

In step 420, the message server 10 tests whether the user 15 has pushed the key of the keyboard 14 of the telecommunication terminal 13. If the response is negative, the message server 10 passes to step 480 described later in this paper. If the response is positive in step 420, the message server 10 passes to step 402.

In step 402, the message server 10 tests whether the message in the course of transmission is a private message or an advertising message. If the message in the course of transmission is a private message, the server 10 passes to step 430 which will be described later. If the message in the course of transmission is an advertising message, the server 10 passes to step 403.

In step 403, the server 10 tests with the help of the time counter T whether the time which has elapsed from the beginning of transmission of the message is greater than or equal to 3 seconds. If the response is negative, which is to say if the elapsed time from the beginning of transmission is less than 3 seconds, the server 10 passes to step 470 which will be described later. If the response to step 403 is positive, the server 10 passes to step 430.

In step 430, the message server 10 determines whether the key which the user 15 has pressed is the key requiring deletion of the message in the course of transmission. If the response is positive, the message server 10 passes to step 440 in which the server 10 deletes the message in the course of transmission from the list of messages held for the user 15, and the step 23B of transmission of a message according to the first embodiment of the present invention, is terminated.

As a modification, in step 440 above, if the message in the course of transmission is an interactive advertising message comprising several portions, the deletion key can permit deleting one or several related advertising messages in a single deletion operation.

If in step 430, if the response is negative, the message server 10 passes then to step 450. In step 450, the message server 10 tests whether the key pressed by the user 15 is the key commanding the server 10 to save the message in the course of transmission. If the response is positive, the message server 10 passes to step 460 in which the message in the course of transmission is saved by the server 10, and step 23B of transmission of a message according to the first embodiment of the present invention is then terminated. If the response to step 450 is negative, then the server passes to step 470.

In step 470, the key pressed by the user 15 is ignored, and the message server 10 passes then to step 280.

In step 480, the server 10 tests whether the message in the course of transmission has been entirely transmitted. If the response is positive, the server 10 returns to step 420 described above. If the response to step 480 is negative, the message server 10 passes to step 490 in which the message server 10 continues to send the message. Then the message server 10 returns to step 420.

In the above description of FIG. 4, when the transmission of the message is completed, the message server 10 returns to step 22 of FIG. 2.

According to the preceding description of FIG. 4, it will be seen that, contrary to what is in the prior art, the keys pressed by the user 15 before expiration of the delay of three seconds counted from the beginning of transmission of an advertising message, are ignored by the message server 10 thanks to the test in step 403. As a result, the user 15 cannot interrupt the transmission of an advertising message before the expiration of this delay, which means that the user 15 must necessarily hear at least the three first seconds of any advertising message sent by the message server 10.

Figure 5:
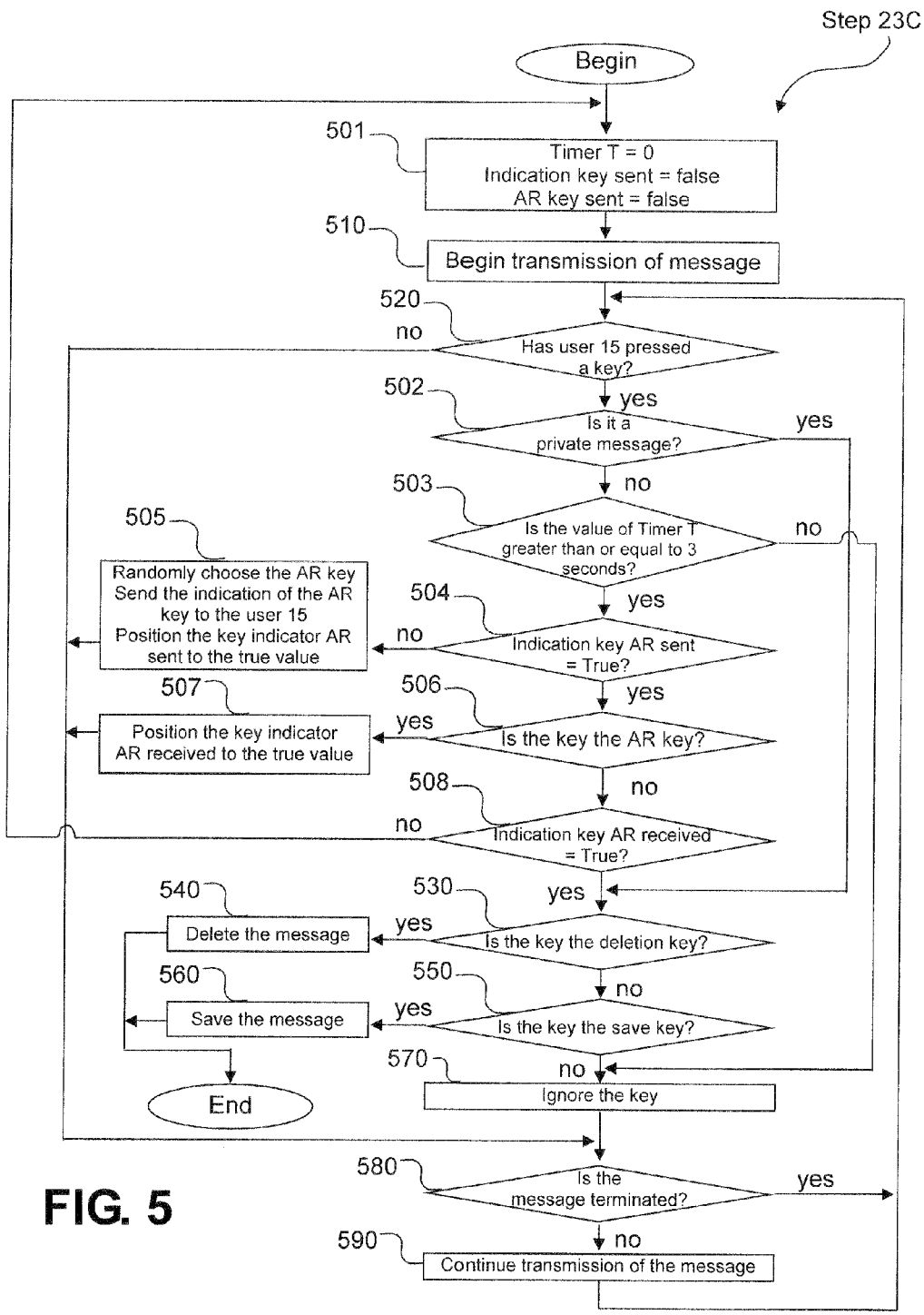
FIG. 5 is a detailed organigram of box 23 of FIG. 2 in a second embodiment of the present invention.

Referring now to FIG. 5, there will now be described in detail step 23 in FIG. 2 in the context of a second embodiment of the present invention, designated by numeral 23C in FIG. 5.

In this embodiment, after having sent the first 3 seconds of the vocal message, the message server 10 selects randomly a key of the keyboard 14 of the telecommunication terminal 13 as the key to acknowledge reception AR for the message in the course of transmission, and the message server 10 indicates verbally to the user 15, by means of the telecommunication terminal 13, which one is the key AR to be used. Then, the server continues to transmit the message until the user 15 pushes the indicated key AR. If the user 15 pushes the key other than the indicated key AR, the message server 10 repeats the transmission of the message from the beginning.

More precisely, the procedure of sending a message to the user 15 by the server 10 begins in step 501.

In step 501, the server 10 starts at value 0 a time counter T, adapted to measure the time elapsed from the beginning of transmission of the message. Also, the server 10 initiates at the "false" value an indication "Indication key AR sent", which serves to memorize the fact that the indication of the key AR has been sent to the user 15 via the telecommunication terminal 13. Similarly, the server 10 initiates to the "false" value an indicator "Key AR received" adapted to memorize the fact that the user 15 has pressed the indicated AR key.

The server 10 then passes to step 510. In step 510, the message server 10 begins to send the message held for the user 15, then it passes to step 520.

In step 520, the message server 10 tests whether the user 15 has pressed the key of the keyboard 14 of the telecommunication terminal 13. If the response is negative, the message server 10 passes to step 580 described later in this paper. If the response is positive in step 520, the message server 10 passes to step 502.

In step 502, the message server 10 tests whether the message in the course of transmission is a private message or an advertising message. If the server 10 determines that the message in the course of transmission is a private message, the server 10 passes to step 530 which will be described later. If the server 10 determines that the message in the course of transmission is an advertising message, the server 10 passes to step 503.

In step 503, the server 10 tests with the help of the time counter T, whether the time which has elapsed from the beginning of transmission of the message is greater than or equal to 3 seconds. If the response is negative, which is to say, if the time elapsed from the beginning of transmission is less than 3 seconds, the server 10 passes to step 570 which will be described later. If the response in step 503 is positive, the server 10 passes to step 504.

In step 504, the message server 10 tests whether key AR has already been selected and sends the indication of the selected key AR to the user 15. To do this, it tests the value of the indicator "Indication key AR sent" which has been started at the "false" value in step 501. If this value remains "false", the message server 10 passes to step 505.

In step 505, the message server 10 selects randomly the key AR and it indicates the recycled key AR to the user 15 by means of a suitable vocal message which it sends to the telecommunication terminal 13. The server 10 then begins at the "true" value the indicator "Indication key AR sent". It will be seen that this indicator accurately reflects the fact that the key AR has been selected and sent, then this indicator is placed at the value "true" only when:

1. the indicator was at the "false" value;
2. the key AR has just been selected and sent.

The message server 10 then passes to step 580 which will be described later.

If in step 504, the response is positive, which is to say that the server 10 has already selected the key AR and sent to the user 15 the corresponding indication, then the "Indication key AR sent" indicator is at the "true" value, whilst the server 10 passes to step 506. In step 506, the server 10 tests whether the key pressed by the user 15 is the key AR previously selected by the server 10. If the response is positive, the server 10 passes to step 507. In step 507, the server 10 positions the "Key AR received" indicator at the "true" value, then it passes to step 580 which will be described later.

If the response in step 506 is negative, which is to say if the key pressed by the user 15 is a key other than the AR key previously selected by the server 10 in step 505, the server 10 passes to step 508. In step 508, the server 10 tests whether the "Key AR received" indicator has the "true" value. If the response is negative, the server 10 returns to step 501 described above, which is to say that it repeats the transmission of the message in the course of transmission from the beginning. If the response in step 508 is positive, which means that the "Key AR received" indicator has been positioned at the "true" value in step 507 described above as a result of reception of the key AR selected by the server 10 in the step 505, then the server 10 passes to step 530.

In step 530, the message server 10 determines whether the key that the user 15 has pressed is the key requiring deletion of the message in the course of transmission. If the response is positive, the message server 10 passes to step 540 in which the server 10 deletes the message in the course of transmission from the list of messages saved for the user 15, and step 23C for transmission of a message according to the second embodiment of the present invention is terminated.

As a modification, in step 540 above, if the message in the course of transmission is an interactive advertising message comprising several portions, the deletion key can permit deleting one or several related advertising messages in a single deletion operation.

If in step 530, the response is negative, the message server 10 then passes to step 550. In step 550, the message server 10 tests whether the key pressed by the user 15 is the key commanding the server 10 to save the message in the course of transmission. If the response is positive, the message server 10 passes to step 560 in which the message in the course of transmission is saved by the server 10, and step 23C of transmission of a message according to the second embodiment of the present invention is then terminated.

If the response to step 550 is negative, then the server passes to step 570. In step 570, the key pressed by the user 15 is ignored, and the message server 10 passes then to step 580.

In step 580, the server 10 tests whether the message in the course of transmission has been entirely transmitted. If the response is positive, the server 10 then returns to step 520 described above. If the response to step 580 is negative, the message server 10 passes to step 590 in which the message server 10 continues to send the message. Then the message server 10 returns to step 520.

In the above description of FIG. 5, when the transmission of the message is terminated, the message server 10 returns to step 22 of FIG. 2.

In view of the preceding description of FIG. 5, it will be seen that, in the first embodiment of the invention and contrary to what was in the prior art, the keys pressed by the user 15 before expiration of the delay of three seconds counted from the beginning of transmission of an advertising message, are ignored by the message server 10 thanks to the test in step 503. As a result, the user 15 cannot interrupt the transmission of the advertising message before the expiration of this delay, which means that the user 15 must necessarily understand at least the three first seconds of any advertising message sent by the message server 10.

Moreover, given that the key permitting deletion of the message is selected and indicated in a random manner by the message server 10 in step 505, the user 15 will necessarily have to pay attention to the beginning of the message sufficiently to note mentally the deletion key to be used, failing which he can't erase the message in the course of transmission, and this will remain in the list of messages held for the user 15. This has the result that the message will again be presented to the user 15 the next time the latter pulls his messages held in the message server 10.

Moreover, in this embodiment, if the user 15 not having listened to the beginning of the message, and hence not knowing the AR key selected by the server 10, seeks to detour the AR procedure described above by pressing at random on one or several keys of the keyboard 15, he will have only a probability equal to one in n, in which n is the number of keys on the keyboard 14, to find by accident on the first try the correct key AR, which is to say, that to find randomly by the server 10 in step 505. In the contrary case, which is to say if the first key pressed at random by the user 15 is not the key selected by the server 10 in step 505, the server 10 will return to step 501, which is to say that the user 15 must again listen to the message in the course of transmission from the beginning, and so on until the user 15 has sufficiently paid attention to the beginning of the message to memorize the deletion key indicated by the server 10.

Thus, in this modification of the process of the invention, the advertiser which is the source of the advertising message is assured that at a minimum the first three seconds of the advertising message will have been understood by all the recipients 15 to which the advertising message will have been transmitted.

In the above, a process has been described which permits ensuring to an advertiser that an advertising message, transmitted for example by telephone line, will have been heard at least in part by all the recipients to which this message will have been addressed. Thus, the process described above has the characteristic, unique relative to the prior art, of guaranteeing to an advertiser that at least a significant portion of his advertising message will have been effectively heard by the recipients, which, in its turn, guarantees to the advertiser a return on his investment in the publicity campaign in question.

The process of the invention is not limited to the embodiments described above. For example, the duration of the minimum delay before deletion of a message can be changed in the scope of the invention, and it can be made variable, as a function of the associated message or of various parameters, such as the cost to the advertiser for broadcasting of the message.

Similarly, other functions than the deletion or the saving of a message in the course of transmission could be carried out if necessary as needed by a particular application. Thus, as indicated above, the operation of deletion of a message could for example be a combined operation permitting the deletion of several advertising messages in a single operation. It is also possible to carry out functions such as the review of messages previously saved, or the interactive review of other messages with the help of keys indicated in the message in the course of transmission.

Moreover, the control device 14 described above permitting the user 15 to indicate to the server 10 the operations to be carried out on the message in the course of transmission could be quite another suitable control device 14 such as a rotatable wheel 14 or a vocal control device 14.

In this latter case, reactions permitting generating suitable control signals for the server 10 will be vocal controls entered by the user 15 via the vocal control device 14, which will replace or be combined with strokes on the keys of the keyboard 14.

Generally speaking, those skilled in the art will be able to provide various modifications or improvements to the embodiments described above without departing from the scope of the invention, which is only limited by the attached claims.

The invention claimed is:

1. Process for reproducing messages in an automated system for distributing messages, the process comprising the steps of:
   communicating between at least one system for storing messages (10) and a device for reproducing messages (13) via a communication channel (12);
   interrogating, by way of an interface of the device for reproducing messages (13) operated by an operator (15), said system for storing messages (10) to retrieve messages stored for the operator from said system for storing messages (10);

in response to the operator's interrogation, transmitting from said system for storing messages (10) a stored message, over said communication channel, to said device for reproducing messages (13);

reproducing, at said device for reproducing messages and in real time for the operator (15), the message transmitted by said system for storing messages (10);

identifying whether the message, in the course of transmission, is one of i) a private message and ii) an urgent or advertising message;

storing information representative of a duration of a minimum delay for the urgent or advertising message identified in said identifying step;

executing, at said system for storing messages, operations on the message in the course of the transmission to said device for reproducing messages (13), said device for reproducing messages (13) comprising at least one control device (14) permitting said operator (15) to generate at least one control signal destined for said system for storing messages (10), said control device (14) allowing the operator, in the course of the transmission of the message from said system for storing messages, to generate and transmit to said system for storing messages (10) the at least one control signal, the at least one control signal controlling said system for storing messages (10) to carry out on said message, in the course of the transmission, a corresponding operation from among said operations, and said corresponding operation including any one of interrupting the message, saving the message, and deleting the message, wherein said executing step at said system for storing messages, for the urgent or advertising message identified in said identifying step, commences after expiration of a minimum delay, the minimum delay counted from the beginning of the transmission of the identified urgent or advertising message to said device for reproducing messages (13) such that the operator cannot interrupt the transmission of the identified urgent or advertising message prior to the expiration of the minimum time delay, thereby assuring that at least a part of the identified urgent or advertising message corresponding to the minimum delay is delivered to the operator of said device for reproducing messages (13).

2. Process for reproducing messages, the process comprising the steps of:

in an automated system for distributing messages comprising at least one system for storing messages (10) and a device for reproducing messages (13), the system for storing messages (10) being adapted to transmit stored messages to the device for reproducing messages (13) through a communication channel (12), the device for reproducing messages (13) permitting the reproduction in real time for an operator (15) of messages transmitted by the system for storing messages (10), the system for storing messages (10) being adapted to carry out operations on a message in the course of transmission, the device for reproducing messages (13) being adapted to transmit to the system for storing messages (10) at least one control signal under the control of said operator (15) during the transmission of the message, each of the at least one control signals permitting controlling the system for storing messages (10) to carry out on the message in the course of transmission a corresponding operation from among the operations, and the device for reproducing messages (13) comprising at least one control device (14) permitting the operator (15) to generate the at least one control signals destined for the system for storing messages (10), identifying whether the message in the course of transmission from the system for storing messages 10 to the device for reproducing messages (13) is one of i) a private message and ii) an urgent or advertising message;

storing, in the system for storing messages (10), information representative of a duration of a minimum delay for the urgent or advertising message identified in said identifying step; and in the system for storing messages (10), disabling the execution of any operation from among said operations on an identified urgent or advertising message identified in said identifying step by said system for storing messages (10) for the minimum time period determined by the stored information, where the operation being disabled is initiated by the at least one control signal sent under the control of said operator (15) during the transmission of the message, the at least one control signal for permitting controlling the system for storing messages (10) to carry out on the message in the course of transmission the corresponding operation from among the operations.

3. Process for reproducing messages in an automated system for distributing messages, comprising the steps of:

communicating via a communication channel of a network (12) from a telecommunication terminal (13) to a system for storing messages (10), said system for storing messages being a message server;

interrogating said system for storing messages (10) through an interface (14) of said telecommunication terminal (13) to retrieve a message stored in said system for storing messages (10) for an operator of said telecommunications terminal;

transmitting, in response to the operator's interrogation from said telecommunication terminal (13), the message from said system for storing messages (10) to said telecommunication terminal (13) over said communication channel;

reproducing, in real time at said telecommunications terminal (13), the message transmitted by said system for storing messages (10);

identifying whether the message, in the course of transmission, is one of i) a private message and ii) an urgent or advertising message;

storing information representative of a duration of a minimum delay for the urgent or advertising message identified in said identifying step;

generating a control signal destined for said system for storing messages (10) by way of the operator using the interface (14) of said telecommunication terminal (13), said control signal for an operation of interrupting the message;

transmitting, in the course of the transmission of the message from said system for storing messages (10), the generated control signal from said telecommunication terminal (13) to said system for storing messages (10) via said communication channel; and receiving said control signal at said system for storing messages (10), said control signal controlling said system for storing messages (10) to perform the operation of interrupting the transmission of the message from said system for storing messages (10) during the transmission, wherein said system for storing messages (10) executes said operation of interrupting the transmission of the identified urgent or advertising message after expiration of the minimum time delay counted from the beginning of the transmission of the identified urgent or advertising message to said telecommunication terminal (13) such that the operator cannot interrupt the transmission of the identified urgent or advertising message before the expiration of the minimum time delay assuring that at least a part of the identified urgent or advertising message corresponding to the minimum time delay is delivered to the operator of said telecommunication terminal (13).

4. An automated system for the broadcasting of messages, the system comprising:

a system for storing messages (10); and a device for reproducing messages (13), said system for storing messages (10) configured to transmit stored messages to said device for reproducing messages (13) through a communication channel (12), said device for reproducing messages (13) configured to reproduce messages in real time to an operator (15), said messages transmitted by said system for storing messages (10), said system for storing messages (10) configured to carry out operations on a message in the course of transmission from said system for storing messages (10) to said device for reproducing messages (13), said device for reproducing messages (13) configured to transmit to said system for storing messages (10) at least one control signal under control of said operator (15) during the transmission of said message, each of said at least one control signal permitting controlling the system for storage of messages (10) to carry out on said message in the course of transmission a corresponding operation from among said operations, and said device for reproducing messages (13) comprising at least one control device (14) permitting said operator (15) to generate said at least one control signal, destined for said system for storing messages (10), wherein the system for storing messages, in operation, executes the process according to claim 2.

5. Process according to claim 2, in which said communication channel (12) is a radio connection and in which said device for reproducing messages (13) is a radio communication terminal.

6. Process according to claim 2, in which said communication channel (12) is a telephone line connection and in which said device for reproducing messages (13) is a conventional telephone station.

7. Process according to claim 2, in which said communication channel (12) is a telematic connection and in which said device for reproducing messages (13) is a telematic communication terminal.

8. Process according to claim 2, in which said communication channel (12) is an interactive television connection and in which said device for reproducing messages (13) is an interactive television receiver.

9. Process according to claim 2, in which said communication channel (12) is a computer network and in which said device for reproducing messages (13) is a computer system connected to said computer network.

10. Process according to claim 2, in which the device for storing messages (10), the device for reproducing messages (13) and said communication channel (12) are integrated into a single device such as an interactive terminal.

11. Process according to claim 2, in which said messages stored in said system for storing messages (10) and transmitted to said device for reproducing messages (13) comprise at least one sonic portion.

12. Process according to claim 11, in which said messages stored in said system for storing messages (10) and transmitted to said device for reproducing messages (13) comprise at least one vocal messages portion.

13. Process according to claim 12, in which said system for storing messages (10) is a vocal message server.

14. Process according to claim 2, in which said messages stored in said system for storing messages (10) and transmitted to said device for reproducing messages (13) comprise at least one portion composed of a text.

15. Process according to claim 2, in which said messages stored in said system for storage of messages (10) and transmitted to said device for reproducing messages (13) comprise at least one image or an assembly of fixed or animated images.

16. Process according to claim 2, in which said messages stored in said system for storing messages (10) and transmitted to said device for reproducing messages (13) permit an interactive dialog with the operator (15).

17. Process according to claim 2, in which said operations that can be carried out on the message in the course of transmission comprise an operation permitting the deletion of the messages being transmitted and at least one other message by a single operation.

18. Process according to claim 2, in which at least one of said control signals controlling said system for storing messages to carry out at least one of said operations on said message in the course of transmission, is determined in real time by said device for reproducing messages (13), and is transmitted in real time to said system for storing messages (10) by said operator (15) via said device for reproducing messages (13).

19. Process according to claim 18, in which one of said at least one control signals determined and transmitted by said device for reproducing messages (13) is transmitted to said storage system for storing messages (10) at any time within said minimum delay starting from the beginning of said transmission of said message.

20. Process according to claim 18, in which said at least one control signal determined and transmitted to the system of storage (10) comprises a signal acknowledging reception of the message in the course of transmission.

21. Process according to claim 20, in which said storage system for storage (10) ignores operations other than the acknowledgement of reception of the message in the course of transmission up to the reception of the acknowledgement of reception.

22. Process according to claim 20, in which said system of storage (10) retransmits at least partially the message in the course of transmission upon reception of an operation other than the acknowledgement of reception.

23. Process according to claim 2, in which one of said at least one control devices (14) present in said device for reproducing messages (13) to send said at least one control signal to said system for storage of messages (10), is a keyboard or a control device (14) comprising at least one key.

24. Process according to claim 23, in which one of said at least one control signals permitting carrying out an operation on a message in the course of transmission is the signal generated by the actuation of a key from among said at least one keys present on said keyboard or said control device (14) comprising at least one key.

25. Process according to claim 2, in which one of said at least one control devices present in said device for reproducing messages (13) to send said at least one control signal to said system for storing messages (10), is a microphone.

26. Process according to claim 25, in which one of said at least one control signals permitting carrying out an operation on a message in the course of transmission, is a vocal command entered by said operator (15) by means of said microphone and transmitted to said storage device (10) by said device for broadcasting messages (13).

27. Process according to claim 2, in which one of said at least one control devices present in said device for reproducing messages (13) to send at least one control signal to said system for storing messages (10), is a voice recognition device.

28. Process according to claim 27, in which one of said at least one control signals permitting carrying out an operation on a message in the course of transmission is a vocal command entered by said operator (15) by means of said voice recognition device.

29. Process according to claim 2, in which said minimum delay is three seconds.

30. Process according to claim 2, in which said messages stored in said system for storing messages (10) and transmitted to said device for reproducing messages (13), are advertising messages.

31. Process according to claim 2, in which the duration of said minimum delay is reduced to zero for certain messages.

32. The process according to claim 2, wherein the duration of the minimum delay is less than a total time of the urgent or advertising message.

\* \* \* \* \*